United States Patent [19]
Kenmochi et al.

[11] Patent Number: 5,557,662
[45] Date of Patent: Sep. 17, 1996

[54] COMMUNICATION APPARATUS CAPABLE OF UTILIZING PORTABLE DEVICE

[75] Inventors: Toshio Kenmochi; Masao Kiguchi, both of Yokohama, Japan

[73] Assignee: Canon Kabushiki Kaisha, Tokyo, Japan

[21] Appl. No.: 335,307

[22] Filed: Nov. 7, 1994

Related U.S. Application Data

[60] Continuation of Ser. No. 113,317, Aug. 30, 1993, abandoned, which is a division of Ser. No. 633,310, Dec. 24, 1990, abandoned.

[51] Int. Cl.$^6$ .................................................. H04M 11/00
[52] U.S. Cl. .................... 379/100; 379/216; 379/356; 379/357
[58] Field of Search .................... 379/355, 356, 379/357, 100, 110, 62, 63, 96, 216

[56] References Cited

U.S. PATENT DOCUMENTS

| | | | |
|---|---|---|---|
| 4,126,768 | 11/1978 | Grenzow | 379/357 |
| 4,130,738 | 12/1978 | Sandstedt | 379/355 |
| 4,759,056 | 7/1988 | Akiyama | 379/357 |
| 4,768,218 | 8/1988 | Yorika | 379/63 |
| 4,817,135 | 3/1989 | Winebaum | 379/355 |
| 4,839,919 | 6/1989 | Borges et al. | 379/96 |
| 4,882,750 | 11/1989 | Henderson et al. | 379/356 |
| 5,073,932 | 12/1991 | Yossifor et al. | 379/62 |

FOREIGN PATENT DOCUMENTS

| 115240 | 8/1984 | European Pat. Off. . |
|---|---|---|

OTHER PUBLICATIONS

Motorola advertizement "The Cellular Connection Accessory"1986.

*Primary Examiner*—Ahmad F. Matar
*Attorney, Agent, or Firm*—Fitzpatrick, Cella, Harper & Scinto

[57] ABSTRACT

There is disclosed a system of a facsimile apparatus and a card-shaped calculator as a portable device to be helped by each user. The telephone number information and other information, which have conventionally registered in the facsimile unit, are stored in the card, which transmits such information to the facsimile unit when the card is set on the facsimile. The transfer of the information between the card and the facsimile unit is conveniently done by photocouplers. The system disperses the information required in the facsimile unit to the individual cards, thereby simplifying the structure and the operation of the facsimile unit. Also the card may be coupled with another facsimile unit so that the card owner can immediately use the registered telephone number information on any facsimile unit.

26 Claims, 15 Drawing Sheets

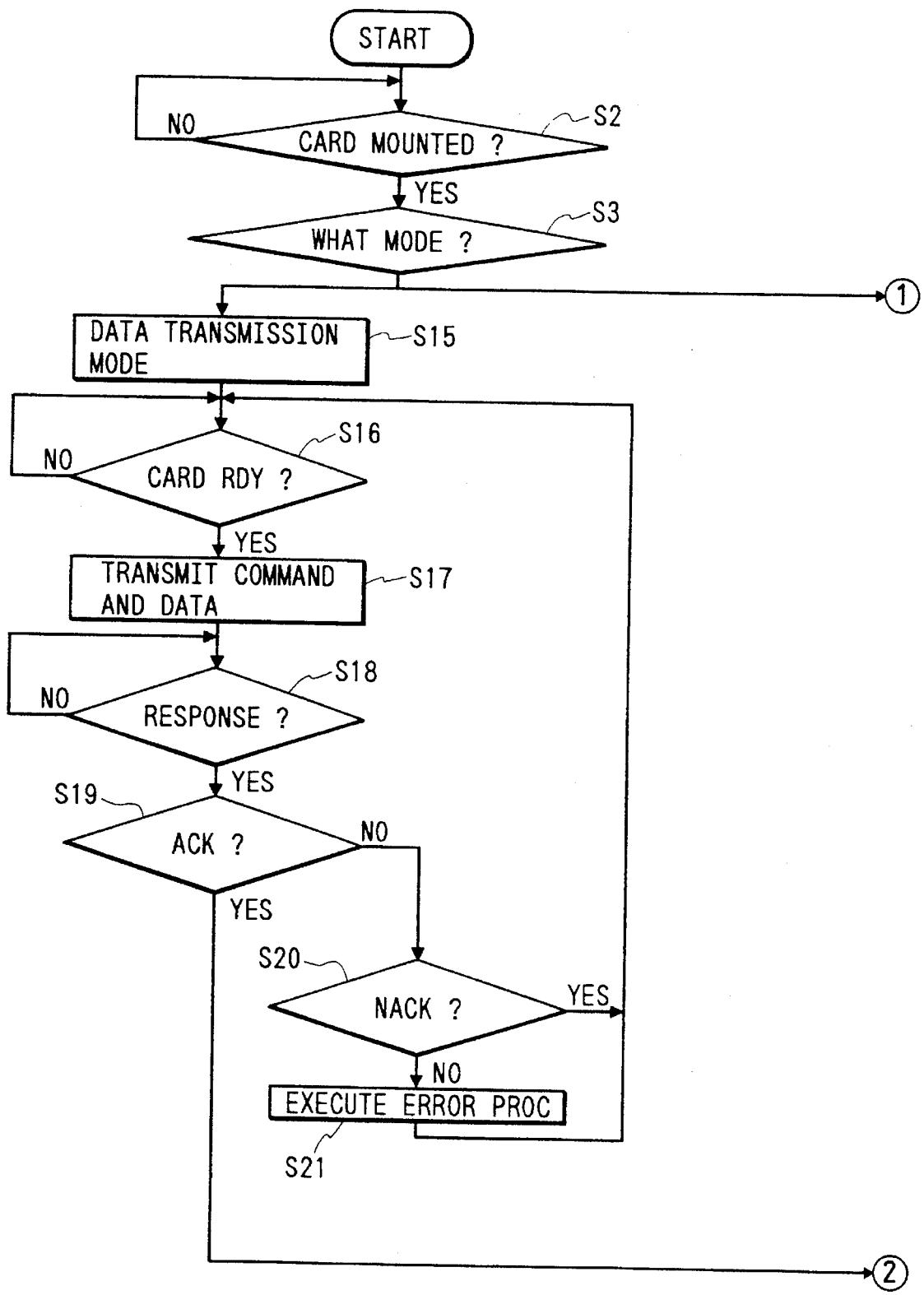

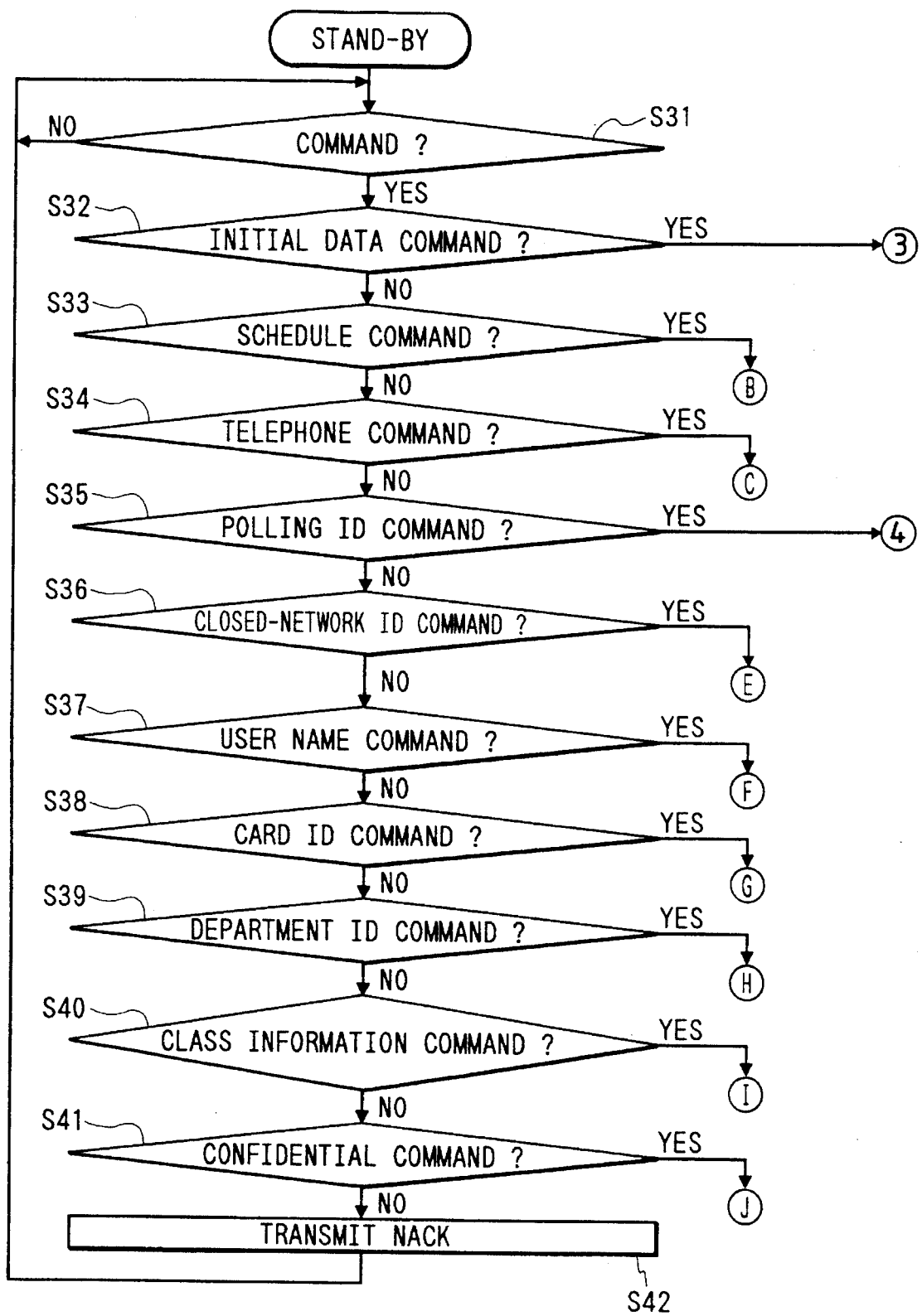

FIG. 13A

| ABBREVI-ATION | MEANING OF ABBREVIATION | FORMAT |
|---|---|---|
| VN | CARD VERSION NUMBER | VN=nn/<br>  nn : VERSION NUMBER<br>      00 ~ 99 |
| MS | CARD MEMORY SIZE | MS=nn/<br>  nn : MEMORY SIZE<br>      01 ~ 99(Kbit) |
| PI | POLLING ID | PI=nnnnnnnn/<br>  n : 0 or 1 |
| NI | CLOSED-NETWORK ID | NI=nnnnnnnn/<br>  n : 0 or 1 |
| YN | USER ABBREVIATION | YN=n · · · n/<br>  n : KANA CHARACTER, ALPHABET, NUMERAL<br>VARIABLE LENGTH<br>MAX : 16 CHARACTERS |

FIG. 13B

| CI | CARD ID | CI=nnnn/<br>    nnnn : 0000~9999 |
|---|---|---|
| DI | DEPARTMENT ID | DI=nnnn/<br>    nnnn : 0000~9999 |
| CJ | CLASS INFORMATION | CJ=n···n/<br>n1 : TRANSMISSION POSSIBLE/TRANSMISSION IMPOSSIBLE=0/1<br>n2 : COPY POSSIBLE/COPY IMPOSSIBLE=0/1<br>n3 : RECEPTION POSSIBLE/RECEPTION IMPOSSIBLE =0/1<br>n4 : FOREIGN AREA=0, DOMESTIC AREA=1, LOCAL AREA=2, EXTENSION=3<br>n5 : HALFTONE POSSIBLE/HALFTONE IMPOSSIBLE =0/1<br>n6 : FINE POSSIBLE/FINE IMPOSSIBLE=0/1 |
| BN | CONFIDENTIAL BOX NUMBER | BN=nn/<br>    nn : 00~99 |
| BI | CONFIDENTIAL BOX ID | BI=nnnn/<br>    nnnn : 0000~9999 |
| FI | FAX ID | FI=nnnnnnn/<br>    nnnnnnn : 0000000~9999999<br>LEAST 7 UNITS OF LINE NUMBER |

FIG. 13C

| CS | CHECK SUM | CS=nn/<br>nn : 00~99 |
|---|---|---|
| TN | PARTNER TELEPHONE NUMBER | TN=n · · · n/<br>n : NUMERAL(0~9)<br>VARIABLE LENGTH  MAX : 32 UNITS |
| CN | PARTNER ABBREVIATION | CN=n · · · n/<br>n : KANA CHARACTER, ALPHABET, NUMERAL<br>VARIABLE LENGTH  MAX : 16 CHARACTERS |
| TM | COMMUNICA-TION MODE | TM=n · · · n/<br>n1 (COMMUNICATION START SPEED)<br>  : 14400bps=9<br>    9600bps=0<br>    7200bps=1<br>    4800bps=2<br>    2400bps=3<br>n2 (MINI FAX MODE)<br>  : NO=0, YES=1<br>n3 (INTERNATIONAL COMMUNICATION MODE)<br>  : NO=0, YES=1<br>n4 (TRUNK CONFIDENTIAL INDICATION)<br>  : NO=0, YES=1<br>n5 (CONFIDENTIAL TRANSMISSION)<br>  : NO=0, YES=1 |
| TB | FIXED MESSAGE | TB=n · · · n/<br>n : KANA CHARACTER, ALPHABET, NUMERAL<br>VARIABLE LENGTH  MAX : 80 CHARACTERS |

FIG. 13D

| SK | SECRET KEY | SK=nnnn/<br>   n : KANA CHARACTER, ALPHABET, NUMERAL<br>SAME AS SECRET KEY OF CARD |
|---|---|---|
| SD | SCHEDULE DATE | SD=nnnnnnnn/<br>   n : NUMERAL (0~9)<br>nn MONTH nn DATE nn HOUR nn MINUTE |
| SM | SCHEDULE MESSAGE | SM=n · · · n/<br>   n : KANA CHARACTER, ALPHABET, NUMERAL<br>VARIABLE LENGTH |
| OD | ONE-TOUCH DIAL NUMBER | OD=nn/<br>   nn : 00~99 |
| CD | ABBREVIATION DIAL NUMBER | CD=nn/<br>   nn : 00~99 |
| MM | OPERATION MODE | MM=nn/<br>   nn : 01= COPY<br>        02= IN TRANSMISSION<br>        03= IN RECEPTION |

FIG. 14

| CODE | CONTENTS OF COMMAND |
|------|---------------------|
| 00 | RESET |
| 01 | TRANSMIT DATA |
| 02 | REQUEST STATUS |
| 03 | READ/WRITE MANAGEMENT DATA |
| 04 | CLEAR |
| 05 | REQUEST INITIAL DATA |
| 10 | REQUEST ALL TELEPHONE DATA IN CARD |
| 11 | REQUEST SCHEDULE DATA IN CARD |
| 12 | TRANSMIT DISPLAY DATA TO CARD |

FIG. 15

| CODE | SOURCE/DESTINATION |
|------|---------------------|
| 00 | NO INDICATION |
| 01 | ORIGINAL DOCUMENT |
| 02 | RECORDING SHEET |
| 03 | MEMORY |
| 04 | MEMORY (FILE) |
| 05 | MODEMU |
| 06 | AD |
| 07 | OA INTERFACE |
| 10 | PARTNER OF CARD |
| 11 | CARD |

5,557,662

1

COMMUNICATION APPARATUS CAPABLE OF UTILIZING PORTABLE DEVICE

This application is a continuation of application Ser. No. 08/113,317, filed Aug. 30, 1993, (now abandoned) which is a division of application Ser. No. 07/633,310, filed Dec. 24, 1990 (now abandoned).

BACKGROUND OF THE INVENTION

1. Field of the Invention

The present invention relates to a communication apparatus for effecting communication based on information received from a portable device.

2. Related Background Art

Conventional so-called electronic telephone directories store telephone numbers and names in pairs. The user can search the telephone numbers and select one of such previously-stored telephone numbers, by manipulating the keys provided on the electronic telephone directory. When a start key is depressed, the electronic telephone directory generates acoustic tones (BP tones) corresponding to the telephone number in display. Thus the user can make a telephone call without using the keys of the telephone set itself, by keeping the speaker of the electronic telephone directory close to the mouthpiece of the handset and depressing the start key.

However the electronic telephone directory may call a wrong destination, due to the noises entering from the mouthpiece of the handset.

SUMMARY OF THE INVENTION

An object of the present invention is to provide an improvement of a communication apparatus capable of functioning in combination with a portable device.

Another object of the present invention is to improve the operability of the communication apparatus.

Still another object of the present invention is to eliminate the noises between the communication apparatus and the portable device.

Still another object of the present invention is to provide a communication apparatus capable, if information cannot be normally received from a portable device, of requesting re-transmission of said information.

Still another object of the present invention is to effectively utilize the display unit of the portable device.

Still other objects of the present invention will become fully apparent from the following description of the preferred embodiments of the present invention.

BRIEF DESCRIPTION OF THE DRAWINGS

FIGS. 3 and 3A–3B are a flow chart of the control sequence of said facsimile apparatus;

FIGS. 6 and 6A–6B are a flow chart of the control sequence of said card;

2

FIGS. 7 to 12 are timing charts of the communication between the facsimile apparatus and the card embodying the present invention;

FIGS. 13A to 13D are tables of abbreviations used in the embodiments;

FIG. 14 is a table of commands used in the embodiments; and

FIG. 15 is a table of codes for source and destination.

DETAILED DESCRIPTION OF THE PREFERRED EMBODIMENTS

In the following the present invention will be explained by an embodiment thereof, in which a portable card-shaped electronic calculator (intelligent card 42) stores telephone numbers, personal information, personal polling ID codes etc. to enable the user to receive various personal services when said card 42 is connected to a facsimile apparatus. Thus the information conventionally registered in a facsimile apparatus is registered in plural cards 42, whereby the expansion or alteration of the function of the facsimile apparatus is rendered possible by suitable card connection to the facsimile apparatus.

The facsimile apparatus of the present embodiment functions according to the data received from the portable electronic telephone directory (card 42).

The system of the present embodiment performs the functions specific to this embodiment, by the connection of the card 42 thereto. The card 42 and the facsimile apparatus each merely has its individual functions, and the personal data stored in the card 42 can be utilized in the facsimile apparatus only when both are mutually connected.

The card 42 and the facsimile apparatus may be connected electrically through a cable or a connector, or optically through a photocoupler.

In case of optical connection, a photodiode and a phototransistor are provided in the transmitting side respectively and in the receiving side.

The interface for data communication between the card 42 and the facsimile apparatus can for example be based on RS232C.

For example, in case a 4-line RS232C interface, there will be required, on the card 42, an output terminal for transmitted data, a corresponding RS input terminal, an input terminal for received data, and a corresponding RS output terminal. Thus the interface on the card 42 and the facsimile apparatus is each composed of two photodiodes and two phototransistors.

The data rate is 600 baud.

Figure 1:
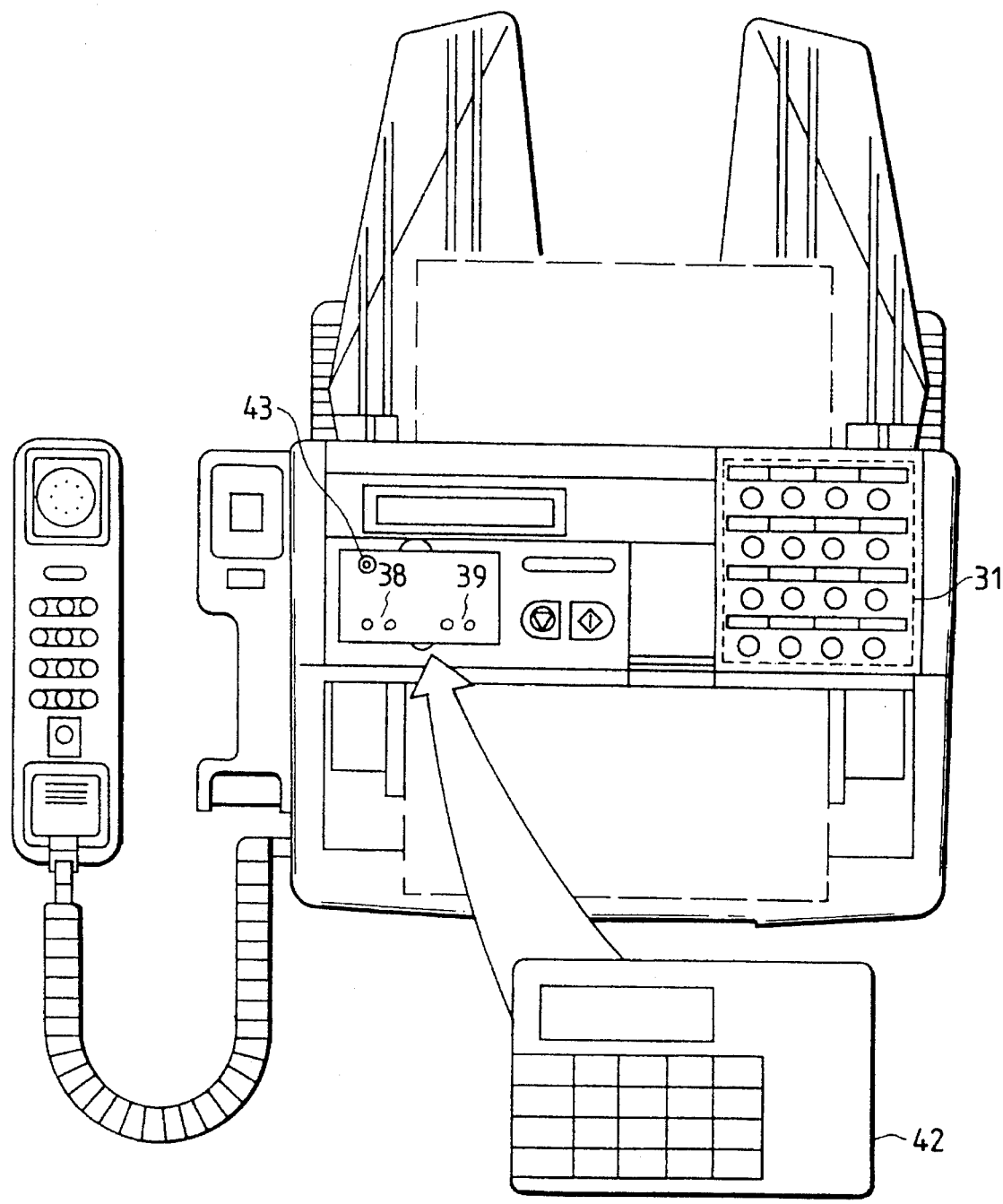
FIG. 1 is a plan view of a facsimile apparatus embodying the present invention.

FIG. 1 is an external view of the facsimile apparatus of the present embodiment, which is provided, in a part of the operation panel thereof, with a recess for setting the card 42. Inside said recess there are provided light-emitting diodes 38, phototransistors 39 and a switch 43 for discriminating whether the card is set. Also there is provided an operation unit 31.

Figure 2:
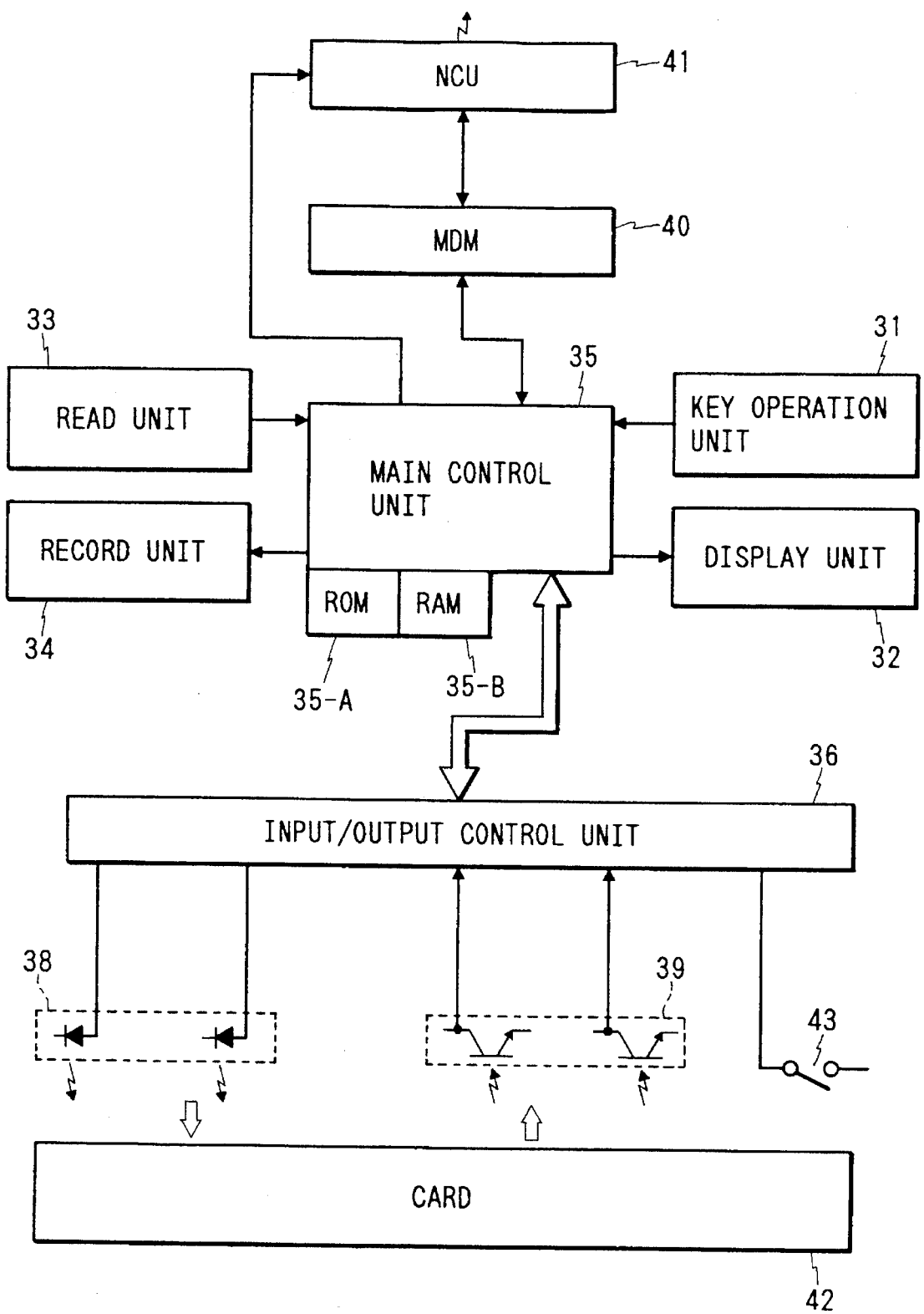
FIG. 2 is a block diagram of said facsimile apparatus.

FIG. 2 is a block diagram of said facsimile apparatus. The operation unit 31 can also control the card 42 from the facsimile apparatus. Said control unit 31 enables the operator to designate the process of a main control unit 35 which receives and transmits input/output signals to and from a photocoupler composed of light-emitting diodes 38 and phototransistors 39 through an input/output controller 36.

A display unit 32 displays the key operations in the operation unit 31 and the process conducted in the main control unit 35, and also displays various data of the card 42.

The main control unit 35 is provided, as a part thereof, with a read-only memory (ROM) 35-A serving as a program memory for the system, and a random access memory (RAM) 35-B for storing various data of the system and various card data, such as telephone numbers, abbreviations of destinations (communication partners) etc. received from the card.

The facsimile apparatus is further provided with an interface circuit with the card, for transmitting various data and commands of the facsimile apparatus through the input/output control unit 36 thereby activating the light-emitting diodes 38 for conversion into optical signals, and a circuit for fetching the optical signals entered by the phototransistors 39 through the input/output control unit 36 with conversion into digital signals and storing said signals in the RAM 35-B through a data bus.

There are further provided a reading unit (read unit) 33 for reading an original document; a recording unit (record unit) 34 for recording various image data and other information; a modem 40 for modulating the transmitted data and demodulating the received data; a network control unit (NCU) 41 for controlling telephone lines; and a switch 43 for detecting that the card 42 is set on the facsimile apparatus.

The facsimile apparatus of the present embodiment is provided with an LED for data transmission, an LED for transmitting signals ACK, NACK and RDY, and a phototransistor for receiving transferred data, and a phototransistor for receiving signals ACK, NACK and RDY.

Figure 3B:
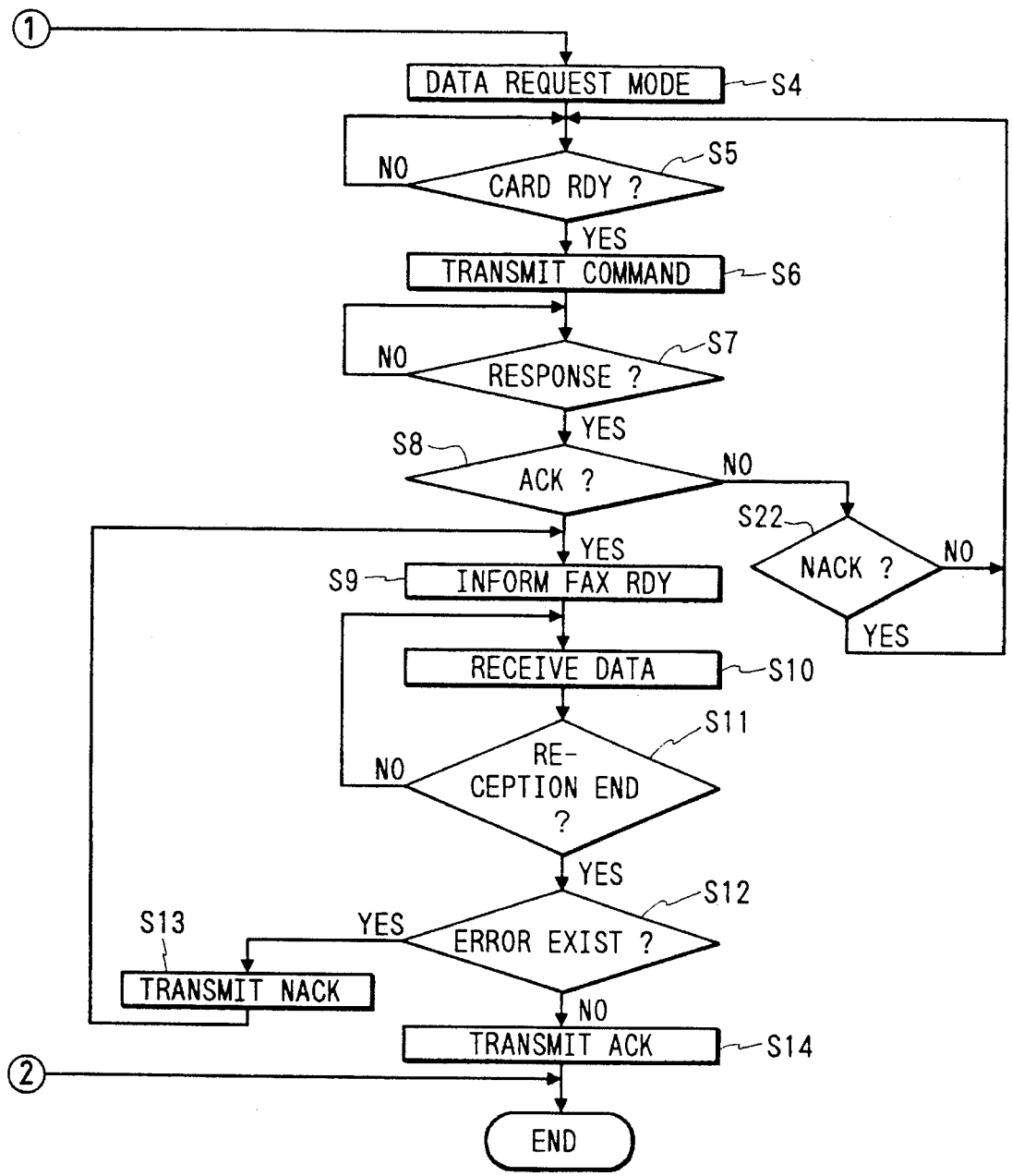

Now reference is made to a flow chart shown in FIG. 3 for explaining the function of the facsimile apparatus.

The main control unit 35 of the facsimile continues to inspect, in a standby state, whether the card 42 is mounted, by the state of the switch 43 (step S2). When said card 42 is mounted, the facsimile apparatus functions in two manners according to the mode selected by the operation unit 31 (step S3).

If a data request mode, in which the facsimile apparatus receives data from the card 42, is selected (step S4), the main control unit 35 discriminates whether the card 42 is capable of receiving a command, by inspecting the ready signal RDY emitted from the light-emitting diode of the card 42 through the phototransistor 39 (step S5). If the card 42 is ready for reception, the main control unit 35 sends a data request command to the card 42 from the light-emitting diode LED 38 (step S6). As will be explained later, said command has a bit map corresponding to initial data, telephone data and schedule data.

After sending the data request command (step S6), the main control unit 35 inspects the response from the card 42 (step S7). If an acknowledgement response ACK is obtained (step S8), the main control unit 35 informs the card 42 of the ready state for reception through the light-emitting diode 38, and enters a data reception ready state (step S9). On the other hand, if a non-acknowledgement response NACK is obtained or neither ACK nor NACK is obtained in the step S8, the sequence returns to the step S6 to re-send the command.

After the step S9, the main control unit 35 receives the data transmitted from the card 42 through the phototransistor 39 (step S10). After the completion of reception (step S11), the main control unit 35 discriminates whether the received data contain an error (step S12), and, if an error is present, sends a command NACK thereby requesting the re-sending to the card 42 (step S13). In the absence of the error in the step S12, it sends a command ACK (step S14) whereby the sequence is terminated (step S15).

On the other hand, if the entered mode is a data transmission mode (step S5), the main control unit 35 discriminates, by the signal RDY, whether the card 42 is ready for data reception (step S16). When the card 42 becomes ready for reception, the main control unit 35 sends a command indicating the data transmission, and sends in succession data of polling ID (identification number), closed-net work ID, user abbreviation, card ID, division ID (department ID), class information and personal information (confidential information) (step S17). Subsequently, after the data transmission, the main control unit 35 inspects the response from the card 42 (step S18). If there is received a response NACK indicating the presence of an error in the transmission (step S20), the main control unit 35 resends the command and the data (step S21). If there is received a response ACK (step S20), the sequence is terminated.

The main control unit 35 may also be so designed as to enter the data request mode without the mode judgement upon mounting of the card, then to identify the mode after data reception in the steps S4 to S14, and to proceeds to the step S15 if the data transmission mode is selected.

Figure 4:
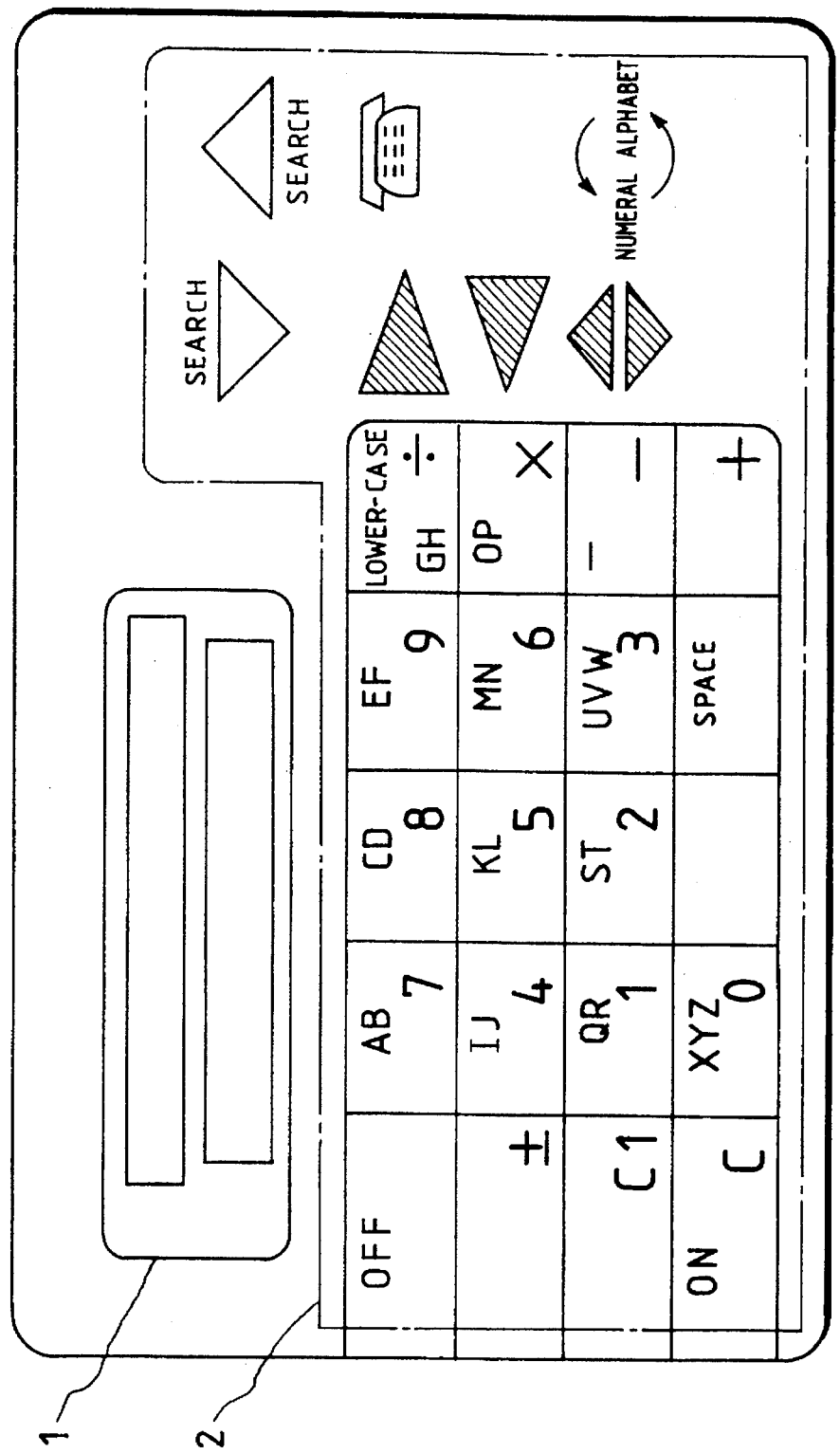
FIG. 4 is a plan view of a card embodying the present invention.
Figure 5:
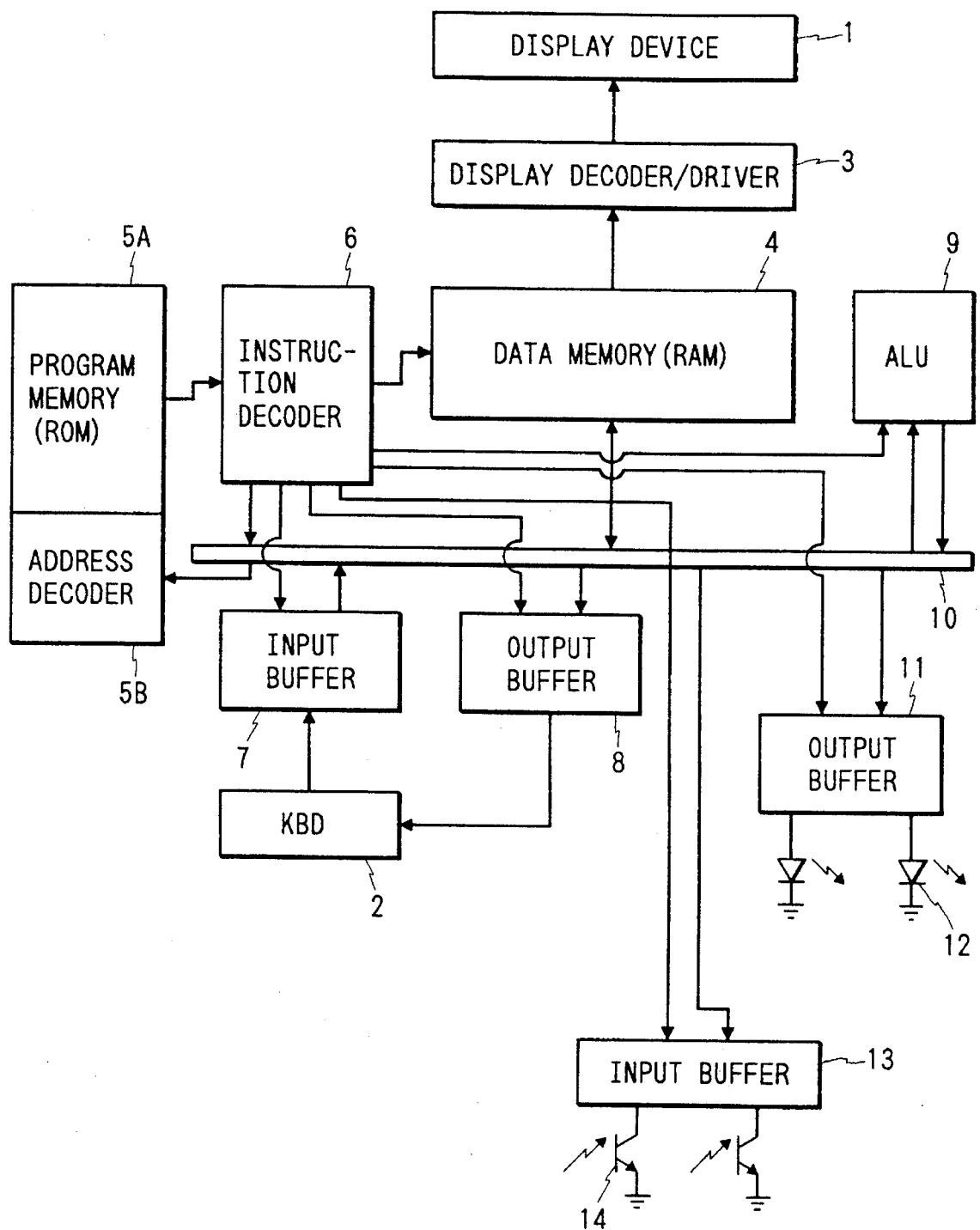
FIG. 5 is a block diagram of said card.

FIG. 4 is a plan view of the portable card 42, and FIG. 5 is a block diagram thereof.

Referring to said block diagram, an instruction stored in an address of a program memory 5A, designated by an address decoder 5B, is decoded by an instruction decoder 6, and various units are controlled by said instruction in synchronization with predetermined clock signals. For example, data stored in a data memory 4, composed of a RAM, are sent to an arithmetic logic unit (ALU) 9 through a data bus 10, then subjected to an arithmetic processing, and the obtained result is stored again in the RAM 4 through the data bus 10. Also data stored in the RAM 4 are supplied to a display decoder/driver 3 to drive a display device 1, whereby said data are displayed. Also one of the key switches of a key-board 2 is actuated through an output buffer 8, a corresponding signal is fetched through an input buffer 7 and stored in the RAM 4 through the data bus 10, and a corresponding process is executed according to a sequence stored in the ROM 5A.

Also the card 42 is provided, as interfaces for external equipment, with a circuit for sending various output data through the data bus 10 to an output buffer 11 thereby driving the light-emitting diode LED 12 and converting said data into optical signals, and a circuit for fetching optical signals received by the phototransistor 14 through an input buffer 13 and storing corresponding data in the RAM 4 through the data bus 10.

For realizing the above-explained example, the RAM 4 stores following data: abbreviations for example for 100 destinations (partners), corresponding telephone numbers and corresponding communication modes; polling ID (8 bits); closed network ID (8 bits); user name (16 characters); card ID (5 digits); division ID (department ID) {5 digits (or units)}; class information (16 bits); confidential box number {2 digits (or units)}; confidential box secret code number {4 digits (or units)}; facsimile identification code {7 digits (or units)} and certain fixed messages.

Figure 6B:
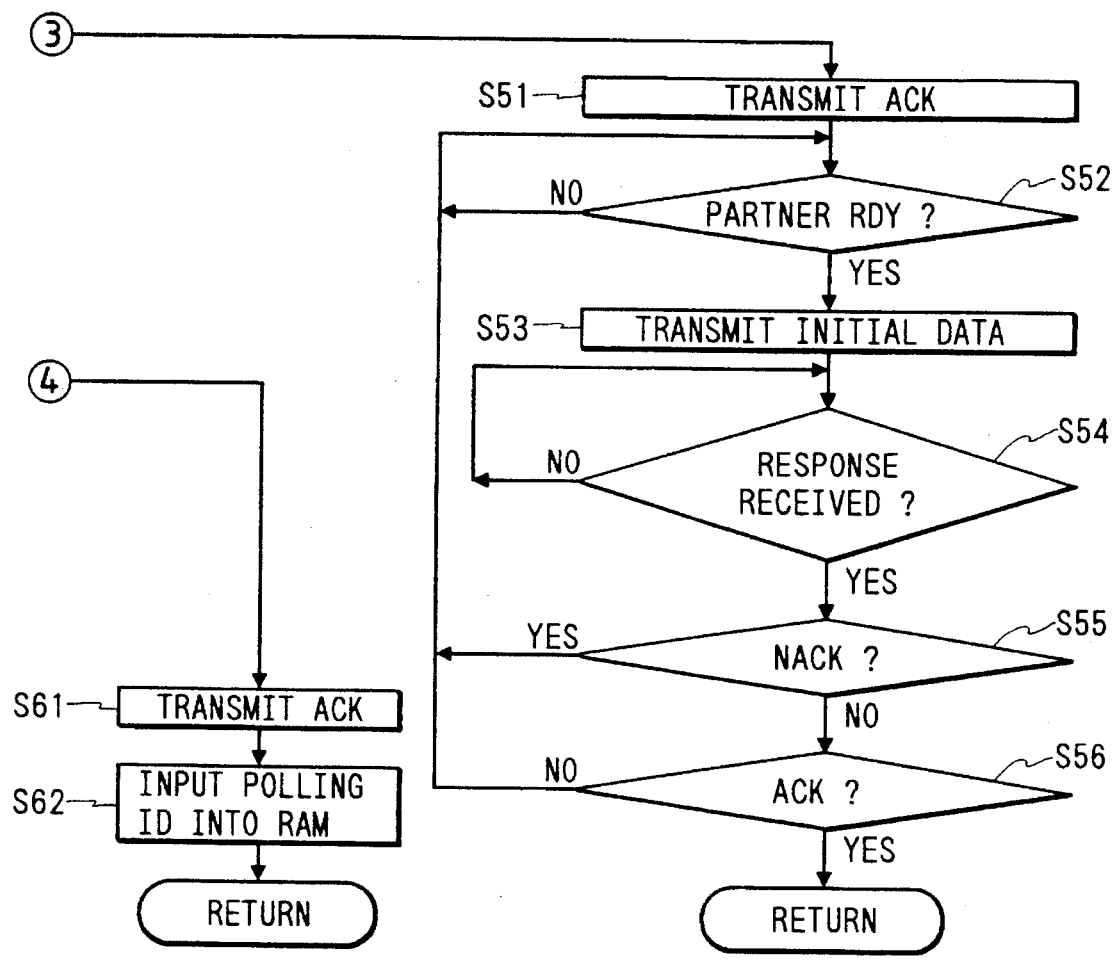

FIG. 6 is a flow chart showing the outline of the control sequence of the card 42 of the present embodiment.

The card 42 functions according to the command received from the facsimile apparatus, and returns a response NACK if the received command is different from the predetermined format.

At first the card 42 is in a standby state, awaiting a command from the facsimile apparatus (step S31). Upon reception of the command (step S31), the card 42 analyzes said command (steps S32–S41) and executes a process corresponding to the received command. Upon reception of a command other than those designated in advance, the card 42 sends a response NACK to the facsimile apparatus (step S42) and returns to the step S31 for awaiting the command in the standby state.

If an initial data transmission command is received, the card 42 sends an ACK signal (step S51), discriminating whether the facsimile apparatus is ready for reception, and waits for the facsimile apparatus to become ready for reception (step S52). If the facsimile apparatus is ready for reception, the card 42 sends the initial data thereto (step S53). Subsequently the card 42 awaits the response from the facsimile apparatus (step S54), and, if a NACK signal is received, it sends the initial data again (step S55). If an ACK signal is received, the data transfer sequence is terminated. If the received response is neither ACK nor NACK, it sends the initial data again (step S56).

If the received command is a schedule data request command or a telephone data request command, the card 42 executes the data transfer in the above-explained sequence, except that the initial data are replaced by schedule data or telephone data.

If the received command is a polling ID input command, the card 42 sends an ACK signal (step S61), and stores the received polling ID in a corresponding memory area of the RAM in the card 42 (step S62).

If the received command is a closed network input command, a user abbreviation input command, a card ID input command, a division department ID input command, a class information input command or a confidential information input command, the card 42 executes the data transfer in the above-explained sequence, except that the transmitted data are respectively replaced by the closed network data, user abbreviation, card ID, department ID, class information or confidential information.

INITIAL DATA

When the card 42 is set on the facsimile apparatus, the main control unit 35 thereof detects said setting, and, if the RS terminal of said card is at a RDY level, sends the initial data request command (CC=051110//) to the card 42.

If said command is correctly received, the card 42 sends the response ACK(06) back, and in succession sends the initial data transmission command and the initial data to the facsimile apparatus.

The data format is (VN=nn/MS=nm/PI= nnnnnnnn/NI= nnnnnnnn/YN=n . . . n/CI=nnnnn/DI= nnnnn/CJ=n . . . n/BN=nn/BI=nn/FI=nnnnnnn/CS=nn//), wherein VN is the card version number; MS is card memory size; PI is polling ID; NI is closed network ID; YN is user name; CI is card ID; DI is department (or division) ID; CJ is class information; BN is box number; BI is box ID; FI is fax ID and CS stands for check sum. In this format, h stands for a hexadecimal data, and n is a numeral from 0 to 9 or an alphabetic character.

The facsimile apparatus sends back a signal ACK or NACK respectively if said initial data are received correctly or not. The card 42 repeats the transmission of the initial data until the ACK signal is sent from the facsimile apparatus.

Also if the card 42 cannot correctly receive the initial data request command, it sends a signal NACK(15) to the facsimile apparatus and awaits the command again.

Figure 7:
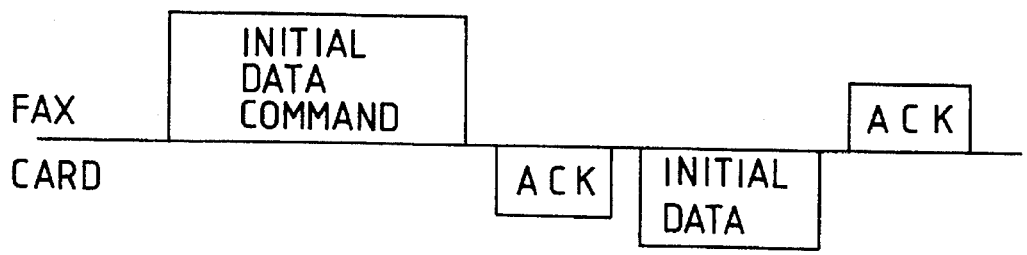

FIG. 7 shows the timing of transmission of the initial data.

In the present embodiment, the card 42 displays a message "BUSY" on the display device 1 when the key input cannot be accepted for example in the course of data transfer.

In the course of data transfer, the key 42 cannot accept the key input, but the user cannot know such state without display. The present embodiment displays the busy state during the data transfer, thereby informing the user that the key input is not acceptable.

In the following there will be explained various data.

In the present embodiment, the card 42 transmits ID information stored therein, such as polling ID, closed network password etc. to the facsimile apparatus.

Upon connection of the card 42 to the facsimile apparatus, said card 42 transmits the ID information stored therein, such as polling ID and closed network passward, to the facsimile apparatus.

In this manner such ID information of the owner of the card 42 can be utilized commonly in different facsimile apparatus.

For example, if the card 42 has a polling ID "00000111" while the facsimile apparatus has a polling ID "11100000", it is replaced as "00000111" upon connection of the card 42 thereto.

Thus said facsimile apparatus can effect a polling operation with another facsimile apparatus having a polling ID "00000111" when the card 42 is connected, but cannot effect such polling operation with said another facsimile apparatus when the card 42 is not connected. On the other hand, when the card 42 is not connected, the facsimile apparatus can effect a polling operation with another facsimile apparatus having a polling ID "11100000".

Conventionally, each facsimile apparatus is given only one polling ID necessary for polling operation, and can therefore effect the polling operation only with a group of facsimile apparatus of a same polling ID. However, such alteration of the polling ID by the card enables different persons to effect the polling operation with different destinations.

Also, each facsimile apparatus is conventionally given only one closed-network ID necessary for closed-network connection of the facsimile apparatus, and can therefore make closed-network connection only with a group of facsimile apparatus of a same closed-network ID. However, such alteration of the closed-network ID by the card enables different persons to make the closed-network connection with different destinations.

Also in the present embodiment, the user name stored in the card 42 is transmitted to the facsimile apparatus.

Upon connection of the card 42 to the facsimile apparatus, said card 42 transfers the user name, stored in advance therein, to the facsimile apparatus.

Thus the user name of the owner of the card 42 can be used as the sender name in the facsimile apparatus to which the card 42 is connected.

Also said user can be combined with the card ID to be explained later, for communication control for each person.

For example, communication control data for communications made with a card can be obtained by connecting said card 42 to a facsimile apparatus and printing said data, such as a communication control report.

If the sender name is to be transmitted in a conventional facsimile apparatus used by plural users, it has been necessary to register the names of plural users in said facsimile apparatus and to select one of said names by a key. According to the present embodiment, a sender name stored in the card 42 is transferred to the facsimile apparatus, so that each sender name can be easily utilized in each facsimile apparatus.

Also in the present embodiment, the card 42 transfers the card ID stored therein to the facsimile apparatus.

Upon connection of the card 42 to the facsimile apparatus, said card 42 transfers the card ID, stored in advance therein, to the facsimile apparatus.

Said card ID can be used for communication control for measuring the amount of communication made by the owner of the card 42, utilizing said card. It may also be used in combination with the user name.

Also in the present embodiment, the card ID of the card 42 may be used for limiting the facsimile apparatus in which said card 42 can be used.

For example, if a card 42 has a 5-digit card ID "35777" and three facsimile apparatus A, B, C respectively have card ID limitations of "7**", "3" and "3", said card 42** can only be used in the apparatus B or C.

In the conventional facsimile apparatus, a limitation in use, such as prohibition of copying operation, has been achieved by a software switch for individual facsimile apparatus, and such software switch has required a cumbersome procedure to modify once it is fixed. However, in the present embodiment, such limitation in use can be easily achieved without altering the software switch in the facsimile apparatus, by registering such limitation in each card.

Also such limitation in use can be removed by a suitable method for example known to the administrator of the facsimile apparatus, such as a setting of bit switches in the apparatus, entry of a password or use of a limitation removing card.

Also said card ID's may be so selected for each facsimile apparatus that same ID number does not appear in different cards.

Also in the present embodiment, the card 42 transfers the department ID, stored therein, to the facsimile apparatus.

Upon connection of the card 42 to the facsimile apparatus, the card 42 transfers the department ID, stored in advance therein, to the facsimile apparatus.

The main control unit 35 utilizes said department ID for communication control, for measuring the amount of communication made by the department to which the owner of the card 42 belongs.

In case the main control unit 35 issues a communication control report while the card 42 is connected, said report may be limited to a department registered in said card.

In such case, if the main control unit 35 is instructed to release the communication control data while the card 42 is not connected, the unit 35 releases the results of all the communications. On the other hand, if the card 42 is connected, the unit 35 result of communications of a department registered in the card 42, so that the operation can be simplified.

Also the department ID can be used for limiting the facsimile apparatus in which the card 42 can be used.

As an example, let us assume a case in which the cards of the personnel department have an 8 digit department ID "10100000"; those of the marketing department have a department ID "00000001"; those of the administration department have a department ID "10100001"; and the facsimile apparatus of the personnel department has a use limitation "101*****" for the department ID. In such case said facsimile apparatus of the personnel department can be used with the cards of the personnel department and those of the administration department, but not with the cards of the marketing department.

Conventional facsimile apparatus have been easily usable by anybody, but the usable facsimile apparatus may be limited by the department ID or the card ID registered in the card 42.

Also in the present embodiment, the card 42 transmits the class information stored therein to the facsimile apparatus.

Upon connection of the card 42 to the facsimile apparatus, the card 42 transmits the class information stored therein to the facsimile apparatus.

Said class information is used for function setting of the facsimile apparatus on which said card is usable.

For example, a card enables transmission and reception, but another card only enables reception. A card enables transmission to any domestic or overseas location, but another card enables transmission only to domestic local area. A card enables transmission in halftone but another Card does not enable such transmission.

Thus the class information includes, for example, transmission enabled/disabled (possible/impossible); reception enabled/disabled (possible/impossible); overseas/domestic; long distance/local; halftone enabled/disabled (possible/impossible); fine quality enabled/disabled (possible/impossible); copy mode enabled/disabled (possible/impossible) etc.

Also in the present embodiment, the card 42 transmits the confidential box number (mail box number), confidential password (confidential number), facsimile identification code etc. to the facsimile apparatus.

Upon connection of the card 42 to the facsimile apparatus, said card 42 transmits these information registered in advance therein to the facsimile apparatus.

Thus, when the card 42 is connected to a facsimile apparatus having a mail box or a confidential box, the apparatus identifies the facsimile identification code of said connected card 42, and, if said code does not indicate said apparatus, it gives an alarm sound or a display that the identification code is wrong. If the identification code is correct, the apparatus identifies the box number and the confidential number, and automatically releases the data contained in the designated box.

In a conventional facsimile apparatus capable of confidential reception, the box number and the confidential password have to be entered from the operation unit of the apparatus for printout of the confidentially received messages so that the operation is cumbersome. On the other hand, in the present embodiment, the confidentially received message can be printed out by the connection of the card 42 so the facsimile apparatus, to that the operation is simplified.

Furthermore, in the present embodiment, the card 42 transmits initial data, such as one-touch key data, stored in said card, to the facsimile apparatus.

Upon receiving the telephone numbers, corresponding names, communication modes, mailbox numbers, instructions for simultaneous transmission etc. from the card 42, the facsimile apparatus alters the contents of the one-touch keys, contracted telephone number key etc. Consequently the operator can make calls by selecting the telephone numbers transferred from the card 42, utilizing the keys of the facsimile apparatus.

More specifically, upon detecting that the card 42 is connected, the facsimile apparatus sends a command for requesting the transfer of the contents of contracted telephone numbers of the card 42, and stores said contents in correspondence with the one-touch keys.

Thus the user can manipulate the one-touch key of the facsimile apparatus corresponding to the contracted telephone number key of his card 42.

For example, if the card 42 has ten contracted telephone number keys 0–9, and the facsimile apparatus has twenty one-touch keys 0–20, the facsimile apparatus stores ten telephone numbers transferred from the card 42 in respective correspondence with the one-touch keys 1–10. On the other hand, if the facsimile apparatus has only five one-touch keys 1–5, the first five out of ten telephone numbers stored in the card 42 are transferred to the one-touch keys of the facsimile apparatus. In this manner the telephone numbers transferred from the card 42 can be selected by the one-touch keys provided in the facsimile apparatus.

Conventionally, when a facsimile apparatus is commonly used by plural persons, the one-touch keys of said apparatus have to be commonly used by such plural persons, so that the number of such keys becomes inevitably insufficient if the number of persons is large. However such deficiency of the keys can be avoided by giving a card to each person and selecting the registered content of each card by the keys of the facsimile apparatus. Also a limited number of keys provided on the facsimile apparatus is sufficient even if the number of user becomes very large.

TELEPHONE CALL OPERATION

A telephone call is made from the facsimile apparatus, based on the telephone number stored in the card 42.

When any of the telephone numbers, corresponding names (abbreviations of destinations or partners), communication modes, mailbox numbers (confidential box numbers) and instructions for relayed same message transmissions, stored in advance in the card 42, is selected by the depression of a one-touch key or telephone keys of the card 42 by the operator, the card 42 transfers the selected data to the facsimile apparatus, thereby causing said apparatus to effect a dialling operation.

Prior to the connection of the card 42 to the facsimile apparatus, the user selects a desired 1 destination for example with the search key of the card 42 and confirms it by the display unit 1 composed for example of a liquid crystal display. Then the user connects the card 42 to the facsimile apparatus and depresses the telephone key of the card 42.

The card 42 transmits the aforementioned initial data, and, when the telephone key in a keyboard 2 is depressed, and if the RS terminal of the facsimile apparatus is in the ready state RDY, sends the abbreviation of destination and the telephone number displayed on the display unit 1, corresponding communication mode, confidential box number, and instruction for simultaneous transmission to the facsimile apparatus.

The data format in this case is (TN=n . . . n/CN=n . . . n/TM=nn/BN=nn/CS=nn//), wherein CN is abbreviated name (contracted name), TN is telephone number of destination, TM is communication mode, and BN is box number.

The communication mode indicates, for example, the communication start speed, minifax, international communication etc.

The facsimile apparatus utilizes the name, transmitted together with the telephone number, as the abbreviation of the destination (or partner); the mail box number for designating a box of the facsimile apparatus of the destination if it has the confidential reception function; and the relayed same message transmission instruction (or trunk multiple address) for instructing the facsimile apparatus of destination if it has such function.

The main control unit 35 of the facsimile apparatus sends an ACK signal to the card 42 if said data are correctly received.

Then the main control unit 35 makes a telephone call utilizing the telephone number in the received data, and, if the destination is a facsimile apparatus, makes communication according to the received communication mode. For example, in case of the international communication mode, the communication is made with a transmission start speed of 4800 bps. If a confidential communication is instructed, the transmission is made to the designated confidential box. If an instruction for relayed same message transmission is selected, the transmission is made in the designated mode. In addition the contracted name of destination is used as the destination in the header part of the transmitted image.

Also if a fixed message is registered in the card 42, the data of such fixed message are transmitted immediately before the CS in the above-mentioned data format.

In this case the data format is (TN=n . . . n/CN=n . . . n/TM=nn/BN=nn/TB=n . . . n/CS=nn//).

In this manner the fixed message registered in the card 42 is transferred to the facsimile apparatus and can be used as image information of the facsimile apparatus.

As an example, a message "Thank you for your continued cooperation:" is registered in the card 42. This message is transferred simultaneously with the transfer of dialling information etc., whereby the facsimile apparatus transfers said message as image information to another facsimile apparatus of the destination.

A similar operation is conducted when a message "Please respond as soon as possible:" is registered A message succeeded by ";" is used repeatedly, while a message succeded by ":" is used only once, and is erased after transmission.

Said fixed message may be singly transmitted as the original of a page to the destination, or may be combined with another text.

Such fixed message eliminates the necessity of addition of such message to the original document for facsimile transmission, thus avoiding the smear of the document.

Furthermore, the card 42 of the present embodiment has a mode of sending, after the initial data transmission, the telephone number of a destination selected by the one-touch key or search key. More specifically, after the transmission of the initial data and the reception of a corresponding ACK signal from the facsimile apparatus, the card 42 transmits, if the RS signal from the facsimile apparatus is in the RDY state, the contracted name of the destination and the telephone number displayed on the display unit 1, and the corresponding communication mode, confidential box number and instruction for relayed same message transmission to the facsimile apparatus.

The data format in this state is (TN= n . . . n/CN=n . . . n/TM=nn/BN=nn/CS=nn//).

If said data are correctly received, the main control unit 35 of the facsimile apparatus sends an ACK signal to the card 42. Then said unit 35 makes a call based on the telephone number in said data, and, if the destination is a facsimile apparatus, effects communication according to the received communication mode.

Also in the present embodiment, after the card 42 is connected to the facsimile apparatus, the operator can cause the facsimile apparatus to dial a selected telephone number, by depressing a one-touch key of the card 42, or selecting a desired destination by the search key, confirming it on the display unit (e.g., LED) and depressing the telephone key of the card 42. More specifically, after the transmission of the initial data and the reception of the corresponding ACK signal, the card 42 enters a key input awaiting state. In this state, if the one-touch key is depressed, or the desired destination is searched in the search mode and then the telephone key is depressed, the card 42 transmits the contracted name of destination and the telephone number, displayed on the display unit 1, and the corresponding communication mode, confidential box number and instruction for relayed transmission, to the facsimile apparatus if the RS signal thereof is in the RDY state.

The data format in this case is (TN= n . . . n/CN=n . . . n/TM=nn/BN=nn/CS=nn//).

Upon correct reception of said data, the main control unit 35 of the facsimile apparatus sends an ACK signal to the card 42, then makes a call to the destination utilizing the telephone number in said data, and, if the destination is a facsimile apparatus, makes communication according to the received communication mode.

On the other hand, if said data cannot be received correctly, the main control unit 35 sends a NACK signal to the card 42, thereby requesting the re-sending of the data.

In response the card 42 repeats data sending until correct reception by the facsimile apparatus, so that erroneous dialling can be prevented.

DATA REGISTRATION IN CARD

In the present embodiment, the telephone number, communication mode and fixed message can be entered from the keyboard of the card, but various data included in the initial data are entered from the keyboard of the facsimile apparatus.

At first, the polling ID can be entered into the card 42 in the following manner.

When the card 42 is connected to the facsimile apparatus, said card 42 enters a command awaiting state to await a command from the facsimile apparatus after the transmission of the initial data and the reception of the ACK signal from said apparatus. In this state, the main control unit 35 of the facsimile apparatus assumes a polling ID input mode by the actuation of a function key. More specifically, when the operator sets the polling ID by the operation unit of the facsimile apparatus and depressed the start key thereof, a polling ID input command (CC=011110/PI=nnnnnnnn/CS= nn//) is transmitted to the card 42.

Input of the closed-network password into the card 42 is conducted in the following manner.

When connected to the facsimile apparatus and after the transmission of the initial data and the reception of the ACK signal from the facsimile apparatus, the card 42 enters a state for awaiting a command thereof. In this state the main control unit 35 of the facsimile apparatus assumes a closed-network password input mode by the actuation of a function key. More specifically, the operator sets a closed-net password by the operation unit 31 of the facsimile apparatus and depresses the start key thereof, whereby a closed-network password input command (CC=011110/CI=nnnnnnnn/CS= nn//) is sent to the card 42.

Input of the user name into the card 42 is conducted in the following manner.

When connected to the facsimile apparatus and after the transmission of the initial data and the reception of the ACK signal from the facsimile apparatus, the card 42 enters a state for awaiting a command therefrom. The main control unit 35 of the facsimile apparatus assumes a user name input mode by the actuation of a function key. More specifically, the operator sets a user name by the operation unit 31 of the facsimile apparatus and depresses the start key thereof, whereby a user name input command (CC= 011110/YN=n . . . n/CS=nn//) is sent to the card 42.

Input of the card ID into the card 42 is conducted in the following manner.

When connected to the facsimile apparatus and after the transmission of the initial data and the reception of the ACK signal from the facsimile apparatus, the card 42 enters a state for awaiting a command therefrom. In this state the main control unit 35 of the facsimile apparatus assumes a card ID input mode by the actuation of a function key. More specifically, the operator sets a Card ID by the operation unit 31 of the facsimile apparatus and depresses the start key thereof, whereby a card ID input command (CC=011110/ CI=n . . . n/CS=nn//) is sent to the card 42.

Input of the department ID into the card 42 is conducted in the following manner.

When connected to the facsimile apparatus and after the transmission of the initial data and the reception of the ACK signal from the facsimile apparatus, the card 42 enters a state for awaiting a command therefrom. In this state the main control unit 35 of the facsimile apparatus assumes a department ID input mode by the actuation of a function key. More specifically, the operator sets a department ID by the operation unit 31 of the facsimile apparatus and depresses the start key thereof, whereby a department ID input command (CC=011110/DI= n . . . n/CS=nn//) is sent to the card 42.

The department ID or card ID cannot be registered by the operation unit 2 of the card 42 but has to be made through the operation unit 31 of the facsimile apparatus after the card 42 is connected thereto. It is therefore not possible for a third person to alter such ID numbers for the purpose of using other facsimile apparatus.

Input of the class information into the card 42 is conducted in the following manner.

When connected to the facsimile apparatus and after the transmission of the initial data thereto and the reception of the ACK signal therefrom, the card 42 enters a state awaiting a command therefrom. In this state the main control unit 35 of the facsimile apparatus assumes a class information input mode by the actuation of a function key. More specifically the operator sets the class information by the operation unit 31 of the facsimile apparatus and depresses the start key thereof, whereby a class information input command (CC= 011110/CJ= n . . . n/CS=nn//) is sent to the card 42.

Input of the confidential information into the card 42 is conducted in the following manner.

When connected to the facsimile apparatus and after the transmission of the initial data thereto and the reception of the ACK signal therefrom, the card 42 enters a state awaiting a command therefrom. In this state the main control unit 35 of the facsimile apparatus assumes a confidential information input mode by the actuation of a function key. More specifically, the operator sets the confidential information by the operation unit 31 of the facsimile apparatus and depresses the start key thereof, whereby a confidential information input command (CC=011110/BN=nn/BI=nn/ FI=n . . . n/CS=nn//) is sent by said main control unit 35 to the card 42.

The registration of data such as polling ID, closed-net ID, user name, card ID, department ID, class information and confidential information into the card 42 will require complex operations if said registration is conducted solely On the operation unit of said card 42. In the present embodiment, the operations of the card 42 can be simplified by entering the aforementioned data from the facsimile apparatus.

Input of the display information into the card 42 is conducted in the following manner.

When connected to the facsimile apparatus, and after the transmission of the initial data and the reception of ACK signal from the facsimile apparatus, the card 42 enters a state awaiting a command therefrom. In this state the facsimile apparatus sends the card 42 a display information input command (CC= 121110/MM=nn/CS=nn//).

This operation enables to display information, that cannot be displayed on the facsimile apparatus, on the display unit 1 of the card 42.

For example, in a facsimile apparatus not equipped with a display unit, the function status of facsimile (copying, transmitting or receiving) can be displayed on the display unit 1 of the card 42.

In response to the above-mentioned data, the card 42 sends the facsimile apparatus an ACK signal or a NACK signal respectively if said data are correctly received or not.

If the NACK signal is received, the facsimile apparatus re-sends the command.

DATA TRANSFER BETWEEN CARD 42 AND FACSIMILE

When connected to the facsimile apparatus and after the transmission of the initial data thereto and the reception of the ACK signal therefrom, the card 42 enters a state awaiting a command therefrom. In this state the main control unit 35 of the facsimile apparatus assumes a telephone data transfer mode by the actuation of a function key, thereby sending an all telephone data reception command (CC=841011/CS=nn/ /) to the card 42.

Upon correct reception of said command, the card 42 returns an ACK signal. In response, and if the RS signal of the card 42 is in the RDY state, the facsimile apparatus sends all the telephone data to the card 42.

The data format in this state is (CC= 101011/OD=nn/ TN=n . . . n/CN=n . . . n/TM=nn/BN=nn/OD=nn/TN=n . . . /CD=nn/TN=n . . . n/CN= n . . . n/TM=nn/BN=nn/CD=nn/ TN=n . . . /TN= n . . . n/CN=n . . . n/TM=nn/BN=nn/TN=n . . . /CS= nn//).

The card 42 receives said data and stores said data in a memory.

Figure 8:
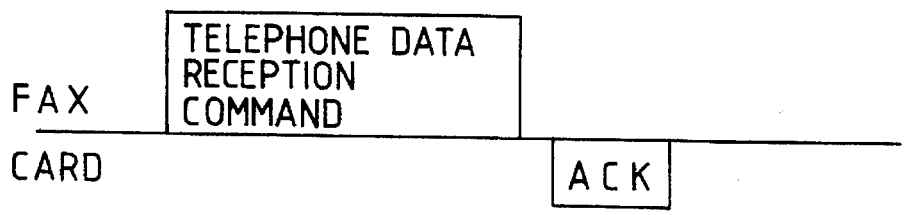

FIG. 8 shows the timing of transfer of telephone number data from the facsimile apparatus to the card 42.

If telephone number data are already registered in the card 42, it sends a NACK signal even if the command is received correctly, as the transmitted data cannot be copied.

In the following explained is the transfer of telephone data, stored in the card 42, to the facsimile apparatus.

When connected to the facsimile apparatus and after the transmission of the initial data thereto and the reception of the ACK signal therefrom, the card 42 enters a state awaiting a command from the facsimile apparatus. In this state the main control unit 35 of the facsimile apparatus assumes a reception mode for the telephone data from the card 42 by the actuation of a function key, thereby sending the card 42 an all telephone data transmission command (CC=101110//) for all the telephone data stored in the card 42.

In response the card 42 sends an ACK signal, and, if the RS signal of the facsimile apparatus is in the RDY state, transmits all the telephone data.

The data format in this state is (OD= nn/TN=n . . . n/CN=n . . . n/TM=nn/BN=nn/OD=nn/TN= n . . . /CD=nn/TN=n . . . n/CN=n . . . n/TM=nn/BN= nn/CD=nn/TN=n . . . /TN=n . . . n/CN=n . . . n/TM=nn/BN=nn/TN=n . . . /CS=nn//).

Figure 9:
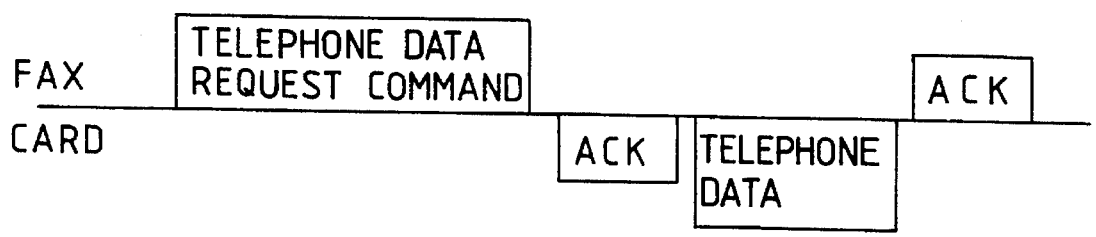

FIG. 9 shows the timing Of telephone data transfer from the card 42 to the facsimile apparatus.

In this manner the telephone data transfer from the card 42 to the facsimile apparatus can be achieved easily.

For example, at first the data registered in the facsimile apparatus, such as the telephone numbers, destinations (partner name) and communication modes registered in the one-touch keys, contracted number keys, electronic telephone directory keys etc., are transferred to and stored in the card 42. Then the card 42 is connected to another facsimile unit whereby the data transferred to and stored in said card 42 can be registered in the one-touch keys, contracted number keys, electronic telephone directory keys etc. of such another facsimile unit.

This procedure simplifies the data registration in these keys when the facsimile unit is replaced by a new one.

Conventionally, if a facsimile unit is broken or is to be replaced, there is required a cumbersome procedure for re-registering the telephone numbers, registered in the one-touch keys and contracted telephone number keys of said facsimile unit, in the new facsimile unit. Such procedure of re-registration can however be eliminated in the present embodiment, by transferring the data of the old facsimile unit to a card and then transferring said data from said card to the new facsimile unit.

In this operation the facsimile unit has to judge the capacity of the card 42. For this purpose, when the card 42 is connected to the facsimile unit, the card sends a code, indicating for example the capacity of the memory incorporated therein, to the facsimile unit.

Thus, in case the data transfer to the card 42 causes erasure of other information stored therein, the card 42 given a warning to the facsimile unit, thereby avoiding the erasure of the data in said card. In such case the facsimile unit gives an alarm of the same meaning to the user.

PRINTOUT

In the following explained is the printout of schedule data stored in the card 42.

The connected to the facsimile apparatus and after the transmission of the initial data thereto and the reception of the ACK signal therefrom, the card enters a state awaiting a command from the facsimile apparatus. In this state the main control unit 35 of the facsimile assumes a schedule print mode by the actuation of a function key, and sends an all schedule data request command (CC=111110/SK= nnnnn//) to the card 42.

In response the card 42 returns an ACK signal, and, if the RS signal of the facsimile apparatus is in the RDY state, sends all the schedule data with a data format (SD= nnnnnnnn/SM=n . . . n/SD=nnnnnnnn/SM=n . . . n/SD= . . . /CS=nn//), wherein SD is schedule data and SM is schedule message with a variable length.

Conventionally, the contents of the telephone data registered in a card-shaped calculator can only be confirmed one by one with the search key. However, in the present embodiment, said contents can be printed out by the facsimile apparatus, by connecting the card 42 to said facsimile.

Figure 10:
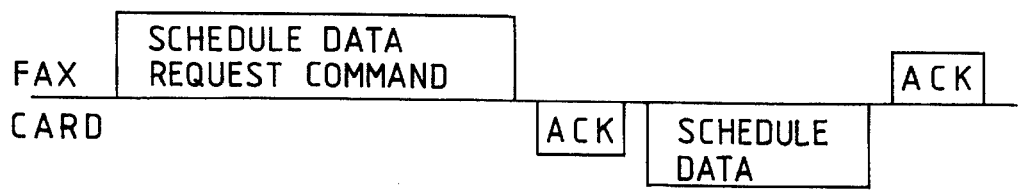

FIG. 10 shows the timing of transfer of the schedule data.

In the following explained is the printout of the telephone data of the card 42.

When connected to the facsimile apparatus and after the transmission of the initial data thereto and the reception of the ACK signal therefrom, the card 42 enters a state awaiting a command from the facsimile. The main control unit 35 of the facsimile apparatus assumes, in this state, a print mode of the telephone data of the card 42, by the actuation of a function key and sends a request command for all the telephone data stored in the card 42, with a data format (CC=101110/SK=nnnnn//). In response the card 42 returns an ACK signal, and if the RS signal of the facsimile is in the RDY state, sends all the telephone data with a data format (OD=nn/TN=n . . . n/CN=n . . . n/TM=nn/BN=nn/OD=nn/TN=n . . . /TN=n . . . n/CN=n . . . n/TM=nn/BN=nn/TN=n . . . /CS=nn//).

Conventionally, the schedule data registered in a card-shaped calculator can only be confirmed one by one with the search key. However, in the present embodiment, said schedule data can be printed out by the facsimile apparatus, by connecting the card 42 to the facsimile.

Figure 11:
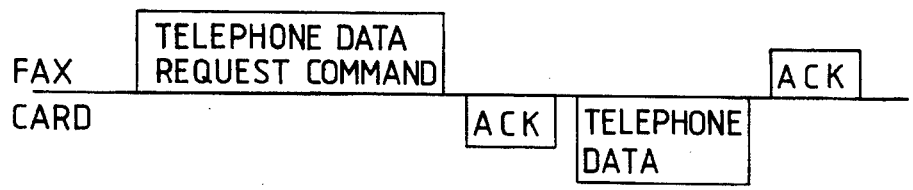

FIG. 11 shows the timing of transfer of the telephone data.

Figure 12:
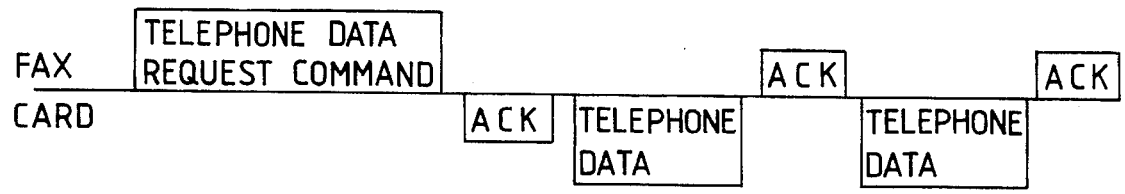

If the memory size of the facsimile is smaller than all the telephone data of the card 42, the card 42 effects plural transfers as shown in FIG. 12.

A similar operation is conducted also for the schedule data.

When the user connects the card 42 to the facsimile apparatus and depresses the schedule key of the card 42, it transmits all the schedule data to the facsimile. Subsequently, when the user actuates a function key of the facsimile apparatus, the main control unit 35 thereof prints the schedule data transferred from the card 42 in chronological order. The facsimile apparatus is also capable of printing the schedule date of the current date, referring to an internal clock.

It is also capable of giving an alarm to the user by buzzer and/or display, when a time of the schedule transferred from the card 42 is reached.

The data mentioned above include not only the schedule data but also other data mentioned before.

Also such data printout may be of confidential nature, so that such printout operation may be designed to require the entry of a password.

If the data transferred from the card 42 are not in the ASCII format, the facsimile apparatus has to be equipped with a conversion table for converting said data into the ASCII format.

FIGS. 13A to 13D are tables showing the abbreviations for data; FIG. 14 is a table of the command system; and FIG. 14 is a table showing the source-destination relation in the command.

The format is CC=aabbcc/, wherein the command starts with "cc="; aa is the content of command; bb is the data source; and cc is the data destination.

In the above-explained embodiment, the card 42 is given the telephone number information, personal information, confidential code such as personal polling ID etc., so that each user can receive various personal services by connecting said card to the facsimile apparatus. In this manner the data which have conventionally been registered in a facsimile apparatus are stored in the cards, whereby the functions of the facsimile apparatus can be expanded or modified by connecting such cards to the facsimile.

The present invention has been explained by a preferred embodiment thereof, but the present invention is not limited by such embodiment and is subject to various modifications within the scope and spirit of the appended claims. For example, the present invention is applicable also to a telephone unit or computer communication conducted according to a predetermined format.

What is claimed is:

1. A communication apparatus comprising:

communication means for communicating with a selected one of plural destinations;

connection means for detachably connecting a portable device to said communication means;

first reception means for receiving a code from the portable device, the code indicating a memory capacity of the portable device;

discriminating means for discriminating whether the portable device is capable of storing information regarding the plural destinations stored in said communication apparatus, based on the code sent from the portable device to said first reception means; and first transmission means for transmitting the information regarding the plural destinations to the portable device according to a discrimination by said discriminating means at a time when said communication apparatus is connected to the portable device via said connection means.

2. A communication apparatus according to claim 1, wherein said communication means is adapted to effect facsimile communication.

3. A communication apparatus according to claim 1, wherein said first transmission means comprises a light-emitting diode for emitting a light according to the information.

4. A communication apparatus according to claim 1, wherein the information regarding the plural destinations is transmitted in the form of light.

5. A communication apparatus according to claim 1, wherein said portable device comprises:

second reception means for receiving the information transmitted by said first transmission means, memory means for storing the information received by said second reception means, and second transmission means for transmitting the information, which is stored in said memory means, to a second communication apparatus.

6. A communication apparatus according to claim 5, wherein said first transmission means includes instruction means for instructing said portable device to transmit information to said second communication apparatus.

7. A communication apparatus according to claim 1, wherein the information includes one-touch dialing data.

8. A communication apparatus according to claim 1, wherein said discrimination means comprises display means for displaying a discrimination result provided by said discrimination means.

9. A communication system including first and second communication apparatuses for communication with a selected one of plural destinations, and a portable device which is detachably connected to either one of said first and second communication apparatuses, wherein said portable device comprises, reception means for receiving information on the plural destinations from said first communication apparatus when said first communication apparatus is connected to said portable device, memory means for storing the information received by said reception means, and transmission means for transmitting the stored information on the plural destinations sequentially and in one operation to said second communication apparatus when said second communication apparatus is connected to said portable device, and wherein the first communication apparatus comprises, discriminating means for discriminating whether said portable device is capable of storing the information on the plural destinations, based on a code indicating a memory capacity of said portable device sent from said portable device to the first communication apparatus, and said reception means receives the information based on a discrimination by said discriminating means.

10. A system according to claim 9, wherein said first and second communication apparatuses effect facsimile communication.

11. A system according to claim 9, wherein said transmission means comprises a light-emitting diode for emitting a light according to the information.

12. A system according to claim 9, wherein the information on the plural destinations is transmitted in the form of light, and wherein said reception means comprises a phototransistor for receiving the light representing the information.

13. A system according to claim 9, wherein the information includes one-touch dialing data.

14. A system according to claim 9, wherein said reception means receives a transmission request from said second communication apparatus connected to said portable device, and said transmission means transmits the information according to the transmission request received by said reception means.

15. A system according to claim 9, wherein said transmission means transmits capacity data of said memory means to said first communication apparatus connected to said portable device, before reception of the information by said reception means.

16. A communication system including a portable device, which connects to either one of first and second communication apparatuses which communicate with a selected one of plural destinations, wherein the portable device comprises:

reception means for receiving information regarding the plural destinations from said first communication apparatus at a time when said first communication apparatus is connected to said portable device;

memory means for storing the information, received by said reception means; and transmission means for transmitting data indicating the capacity of said memory means to said first communication apparatus at a time when said first communication apparatus is connected to said portable device and the stored information regarding the plural destinations to said second communication apparatus at a time when said second communication apparatus is connected to said portable device, and wherein the first communication apparatus comprises discriminating means for discriminating whether said portable device has a capacity sufficient to store the information regarding the plural destinations based on the capacity data, and wherein said reception means receives the information regarding the plural destinations based on a discrimination by said discriminating means.

17. A communication system according to claim 16, wherein said first and second communication apparatuses are adapted to effect facsimile communication.

18. A communication system according to claim 16, wherein said transmission means comprises a light-emitting diode for emitting a light according to the information.

19. A communication system according to claim 16, wherein the information on the plural destinations is transmitted in the form of light, and wherein said reception means comprises a phototransistor for receiving the light representing the information.

20. A communication system according to claim 16, wherein the information includes one-touch dialing data.

21. A communication system according to claim 16, wherein said reception means receives a transmission request from said second communication apparatus at time when said first communication apparatus is connected to said portable device, and said transmission means transmits the information according to the transmission request received by said reception means.

22. A communication system according to claim 16, wherein said transmission means transmits the capacity data of said memory means to said first communication apparatus at a time when said first communication apparatus is connected to said portable device, before reception of the information by said reception means.

23. A control method of a communication apparatus which is capable of connecting to a portable device, comprising the steps of:

receiving a code indicating a memory capacity of the portable device, which code is sent from the portable device to the communication apparatus;

discriminating whether the portable device is capable of storing information on plural destinations stored in said communication apparatus, based on the code received in said receiving step; and transmitting the information on the plural destinations to the portable device according to the discrimination in said discriminating step, at a time when the communication apparatus is connected to the portable device.

24. A method according to claim 23, wherein the information on the plural destinations is transmitted as an optical signal in said transmitting step.

25. A method according to claim 23, wherein the information on the plural destinations to which facsimile data is to be sent, is transmitted in said transmitting step.

26. A method according to claim 23, wherein said discriminating step includes a step of displaying a discrimination result of said discriminating step.

* * * * *

UNITED STATES PATENT AND TRADEMARK OFFICE
CERTIFICATE OF CORRECTION

PATENT NO. : 5,557,662

DATED : September 17, 1996

INVENTORS : TOSHIO KENMOCHI ET AL.

It is certified that error appears in the above-identified patent and that said Letters Patent is hereby corrected as shown below:

COLUMN 2

Line 36,   Delete "respectively";
  Line 37,   "side." should read --side respectively.--.

COLUMN 4

Line 6,    "closed-net work" should read --closed-network--;
  Line 19,   "proceeds" should read --proceed--.

COLUMN 6

Line 18,   "password," should read --password,--.

COLUMN 7

Line 57,   "unit 35 result" should read --unit 35 releases the result--.

COLUMN 8

Line 23,   "Card" should read --card--;
  Line 37,   "these" should read --the--.
  Line 55,   "so" should read --to-- and "to" should read --so--.

UNITED STATES PATENT AND TRADEMARK OFFICE
CERTIFICATE OF CORRECTION

PATENT NO. : 5,557,662

DATED : September 17, 1996

INVENTORS : TOSHI KENMOCHI ET AL.

It is certified that error appears in the above-identified patent and that said Letters Patent is hereby corrected as shown below:

COLUMN 9

Line 29, "user" should read --users--;
Line 46, "desired 1" should read --desired--.

COLUMN 10

Line 40, "registered" should read --registered.--.

COLUMN 12

Line 24, "Card" should read --card--.

COLUMN 13

Line 10, "On" should read --on--.

UNITED STATES PATENT AND TRADEMARK OFFICE
CERTIFICATE OF CORRECTION

PATENT NO. : 5,557,662

DATED : September 17, 1996

INVENTORS : TOSHI KENMOCHI ET AL.

It is certified that error appears in the above-identified patent and that said Letters Patent is hereby corrected as shown below:

COLUMN 14

```
Line 17,    "Of" should read --of--;
Line 49,    "given" should read --gives--;
Line 57,    "The" should read --When--.
```

Signed and Sealed this

Fourth Day of March, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,557,662

DATED : September 17, 1996

INVENTORS : TOSHIO KENMOCHI ET AL.

It is certified that error appears in the above-identified patent and that said Letters Patent is hereby corrected as shown below:

ON TITLE PAGE

After "[22] Filed: Nov. 7, 1994" please insert:

--[30]  Foreign Application Priority Data
    December 26, 1989   [JP]   Japan ..... 1-339203--.

Signed and Sealed this

Eighth Day of April, 1997

Attest:

BRUCE LEHMAN

Attesting Officer    Commissioner of Patents and Trademarks